United States Patent
Park et al.

(10) Patent No.: US 10,022,664 B2
(45) Date of Patent: Jul. 17, 2018

(54) CANISTER FOR VEHICLE HAVING AUXILIARY CANISTER

(71) Applicant: LEEHAN CORPORATION, Hwaseong (KR)

(72) Inventors: Min Young Park, Suwon (KR); Cheong Yong Cho, Siheung (KR)

(73) Assignee: LEEHAN CORPORATION, Hwaseong (KR)

(*) Notice: Subject to any disclaimer, the term of this patent is extended or adjusted under 35 U.S.C. 154(b) by 38 days.

(21) Appl. No.: 15/202,422

(22) Filed: Jul. 5, 2016

(65) Prior Publication Data

US 2017/0304766 A1 Oct. 26, 2017

(30) Foreign Application Priority Data

Apr. 20, 2016 (KR) .................. 10-2016-0048145

(51) Int. Cl.
  *F02M 25/08* (2006.01)
  *B01D 53/04* (2006.01)
  *B60K 15/035* (2006.01)

(52) U.S. Cl.
  CPC .... *B01D 53/0415* (2013.01); *B60K 15/03504* (2013.01); *F02M 25/0854* (2013.01); *B01D 2253/102* (2013.01); *B01D 2259/4516* (2013.01); *B01D 2259/4566* (2013.01); *F02M 2025/0863* (2013.01)

(58) Field of Classification Search
  CPC ............. B01D 53/04; B01D 53/0415; B01D 2253/102; B01D 2259/4516; B01D 2259/4566; F02M 25/0854
  USPC ...... 96/131, 132, 147, 154; 95/146; 123/519
  See application file for complete search history.

(56) References Cited

U.S. PATENT DOCUMENTS

| 4,386,947 | A | * | 6/1983 | Mizuno | .................. | B01D 53/02 |
| | | | | | | 123/519 |
| 6,097,011 | A | * | 8/2000 | Gadkaree | ............... | B01D 53/02 |
| | | | | | | 219/202 |

(Continued)

FOREIGN PATENT DOCUMENTS

| JP | 2002-48015 A | 2/2002 |
| KR | 10-2004-0072638 A | 8/2004 |

(Continued)

OTHER PUBLICATIONS

Office Action from Korean Patent Office for Application No. 10-2016-0048145, dated Aug. 1, 2016.

*Primary Examiner* — Frank Lawrence

(57) ABSTRACT

Disclosed is a canister for a vehicle having an auxiliary canister, which includes: a main canister that has an inlet and an outlet formed therein, an evaporation gas being introduced into the main canister through the inlet from a fuel tank and the evaporation gas introduced through the inlet being discharged through the outlet to the intake side of an engine when the engine is driven, and has a trapping member therein; and an auxiliary canister that is installed to communicate with the main canister to allow external air to be introduced into the main canister or to allow the evaporation gas to flow when the engine is turned off, and has a second trapping member therein, wherein the auxiliary canister includes the second trapping member therein, which has a plurality of pores in the form of a honeycomb.

5 Claims, 11 Drawing Sheets

(56) References Cited

U.S. PATENT DOCUMENTS

| | | | | |
|---|---|---|---|---|
| 6,230,693 B1* | 5/2001 | Meiller | ............ | F02M 25/0854 |
| | | | | 123/519 |
| 6,695,896 B2* | 2/2004 | Hara | ................ | B01D 53/0446 |
| | | | | 123/519 |
| 6,814,771 B2* | 11/2004 | Scardino | ........... | B01D 53/0415 |
| | | | | 123/198 E |
| 6,896,852 B1* | 5/2005 | Meiller | ............ | B01D 53/0415 |
| | | | | 123/519 |
| 7,462,224 B2* | 12/2008 | Wolff | ............... | B01D 53/0407 |
| | | | | 123/519 |
| 7,909,919 B2* | 3/2011 | Kosugi | ............ | B01D 53/0407 |
| | | | | 123/519 |
| 8,997,719 B2* | 4/2015 | Kosugi | ........... | B60K 15/03504 |
| | | | | 123/519 |
| 9,702,322 B2* | 7/2017 | Makino | ............ | F02M 25/0854 |
| 2002/0078829 A1* | 6/2002 | Scardino | ............... | B01D 53/02 |
| | | | | 96/147 |

FOREIGN PATENT DOCUMENTS

| | | |
|---|---|---|
| KR | 10-2005-0096587 A | 10/2005 |
| KR | 10-2008-0080552 A | 9/2008 |
| KR | 10-0872658 B1 | 12/2008 |
| KR | 10-2009-0111177 A | 10/2009 |
| KR | 10-1040965 B1 | 6/2011 |
| KR | 10-1395923 B1 | 5/2014 |
| WO | WO 2003/046362 A1 | 6/2003 |
| WO | WO 2007/081745 A2 | 5/2007 |

* cited by examiner

<PRIOR ART>

122

CANISTER FOR VEHICLE HAVING AUXILIARY CANISTER

BACKGROUND OF THE INVENTION

1. Field of the Invention

The present invention relates to a canister for a vehicle, and more specifically, to a canister for a vehicle having an auxiliary canister that can minimize bleed emission by effectively trapping an evaporation gas within the canister.

2. Description of the Prior Art

In general, gasoline stored in a fuel tank is fed into an engine by a fuel pump, and the unused fuel is sent back to the fuel tank. The fuel sent back to the fuel tank rises in temperature by the heat generated when the engine is driven, and in a case where the ambient temperature rises to a high temperature, as in the summer, the temperature of the gasoline within the fuel tank further rises.

When the temperature of the gasoline within the fuel tank rises as described above, a harmful gas, such as hydrocarbon (HC), may be generated. The generated harmful gas is discharged to the outside of the fuel tank through a pipeline coupled to the fuel tank, and a canister serves as a reservoir where the harmful gas discharged to the outside is stored.

As described above, the canister stores the harmful evaporation gas, which is generated in the fuel tank of the vehicle, by adsorbing it onto an activated carbon provided within the canister when the engine does not operate, and feeds the stored evaporation gas, which is adsorbed onto the activated carbon, into the engine such that the evaporation gas is burned when the engine operates so that the RPM thereof increases, thereby preventing a fuel loss generated in the fuel tank.

A general example of a conventional canister having a function similar to that described above is illustrated in FIG. 1, and the conventional canister will be described with reference to the drawing.

The generally used canister 10, as illustrated in FIG. 1, includes: a housing 11 filled with an activated carbon; an intake port 12 that is provided on the upper portion of the housing 11 and through which an evaporation gas, which is a harmful gas, is introduced into the housing from a fuel tank; a discharge port 13 through which the evaporation gas is discharged to the intake side of an engine when the engine is driven; and an air intake port 14 through which air is introduced into the canister 10 from the outside or the evaporation gas adsorbed onto an activated carbon 15 is discharged to the outside when the engine is turned off.

Here, the housing 11 is divided into the main canister 10a that adsorbs and stores the evaporation gas and an auxiliary canister 10b that prevents the evaporation gas not adsorbed in the main canister 10a from being discharged to the outside. The main canister 10a and the auxiliary canister 10b may be installed to communicate with each other. The intake port 12 and the discharge port 13 may be formed on the main canister 10a, and the air intake port 14 may be formed on the auxiliary port 10b.

Namely, in the conventional canister 10, the main canister 10a traps most of the evaporation gas, and the auxiliary canister 10b serves to introduce external air into the canister (i.e., the housing 11) while trapping some evaporation gas not trapped by the main canister 10a.

However, in the conventional canister 10, the auxiliary canister 10b having the air intake port 14 formed thereon is filled with an activated carbon in order to enhance the trapping performance of the evaporation gas and to minimize the discharge of the evaporation gas to the outside.

As a result, the performance of trapping the evaporation gas is enhanced, but when foreign substances are excessively trapped in the activated carbon 15, bleed emission may arise in which ventilation resistance increases and the evaporation gas not adsorbed by the main canister 10a is discharged to the air while passing through the auxiliary canister 10b as it is.

Accordingly, the present applicant has devised a canister for a vehicle having an auxiliary canister capable of solving the above-described problem.

SUMMARY OF THE INVENTION

According to an embodiment of the present invention, there is provided a canister for a vehicle having an auxiliary canister that can minimize bleed emission in which an evaporation gas is discharged to the air.

A canister for a vehicle having an auxiliary canister is disclosed. The canister for a vehicle having an auxiliary canister, according to an embodiment of the present invention, includes: a main canister 110 that has an inlet 112 and an outlet 114 formed therein, an evaporation gas (HC) being introduced into the main canister 110 through the inlet 112 from a fuel tank, and the evaporation gas introduced through the inlet 112 being discharged through the outlet 114 to the intake side of an engine when the engine is driven, and has a trapping member therein; and an auxiliary canister 120 that is installed to communicate with the main canister 110 to allow external air to be introduced into the main canister 110 or to allow the evaporation gas (HC) to flow when the engine is turned off, and has a second trapping member 122 therein, wherein the auxiliary canister 120 includes the second trapping member 122 therein, which is formed of a plastic material and has a plurality of pores in the form of a honeycomb.

The canister for a vehicle having an auxiliary canister, according to the embodiment of the present invention, includes the auxiliary canister provided on a side of the main canister and the trapping member installed in the auxiliary canister, which is formed of a plastic material and to which an adsorbent material is applied, to reduce ventilation resistance, thereby minimizing the occurrence of bleed emission.

Namely, an evaporation gas and various foreign substances can be adsorbed in fine pores formed in the surface of the trapping member by applying or impregnating an adsorbent material to the exterior of the trapping member that is formed of a plastic material and has a honeycomb shape, and it is possible to minimize bleed emission, such as preventing an increase in ventilation resistance, by minimizing the installation space within the canister.

Further, since the trapping member is injection molded with a plastic material, the trapping member can be implemented through injection molding such that the trapping member has a desired external shape (such as a rectangular, circular, oval, triangular, or polygonal shape) and an internal shape (such as a honeycomb shape, or a circular or triangular shape) and the length thereof is freely adjusted.

Moreover, both a spray coating method and a dipping method can be used to apply an adsorbent material, and it is possible to form an activated carbon layer with an adsorbent material having a uniform thickness of 0.1 mm to 1 mm on the whole according to a required HC trapping capacity.

Also, the trapping member can be formed of various plastic materials according to environments in which it is used.

In addition, the canister is divided into the main canister and the auxiliary canister, and the auxiliary canister is configured to be removable (detachable) from the main canister so that it is possible to separate and replace the auxiliary canister according to circumstances.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, a canister for a vehicle having an auxiliary canister, according to an embodiment of the present invention, will be described in detail.

The canister 100 for a vehicle, which has the auxiliary canister, according to the embodiment of the present invention, in which the auxiliary canister 120 is provided on a side of the main canister 110 and a second trapping member 122 formed of a plastic material, to which an adsorbent material is applied, is installed within the auxiliary canister 120, may prevent a ventilation resistance increase generated by using an existing powder form of adsorbent material, and may consequently enhance trapping efficiency, such as minimizing bleed emission, etc. Alternatively, it should be understood that the second trapping member 122 may be formed of various types of ceramic material, although the present disclosure mainly focuses upon the use of plastic material.

Figure 1:
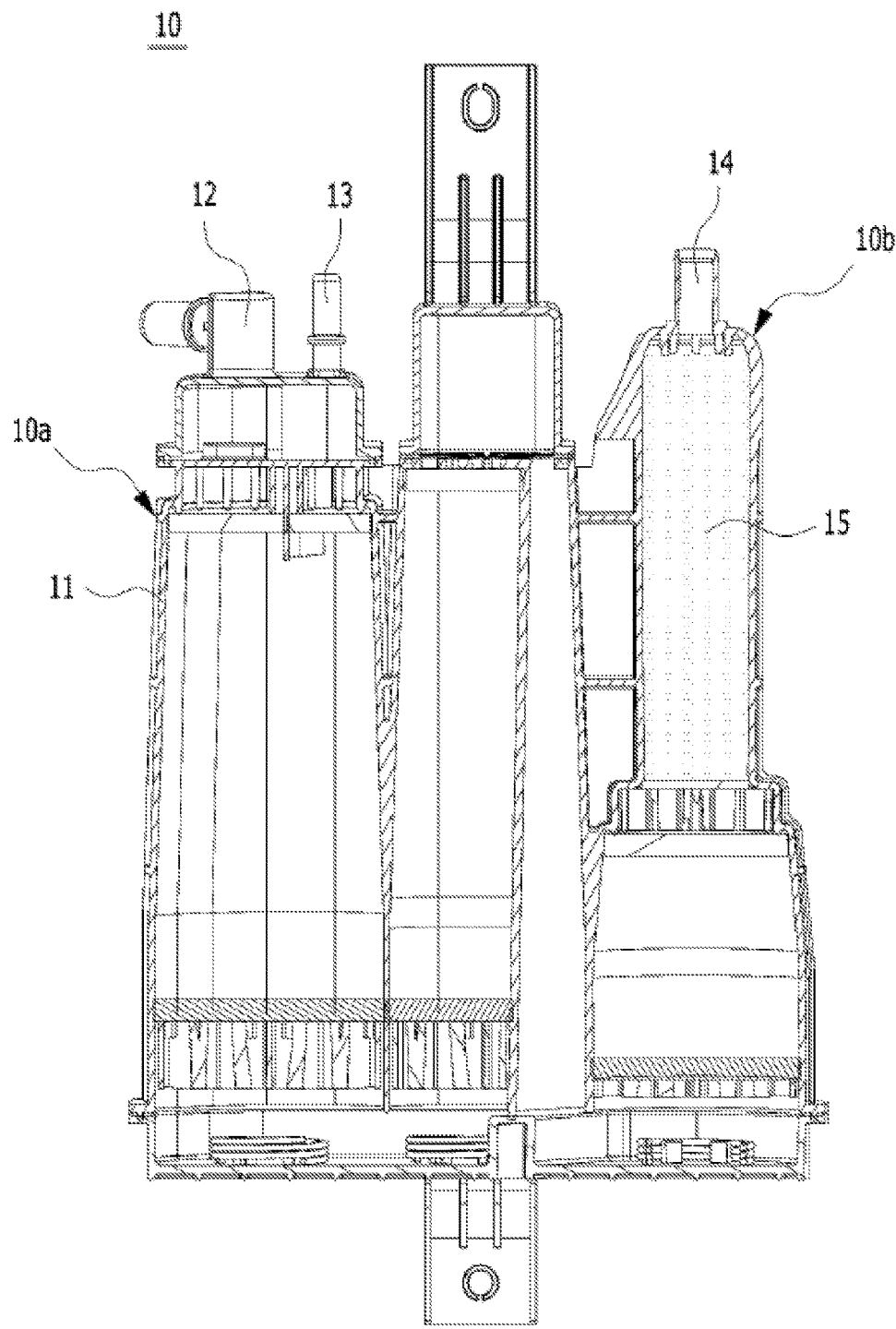
FIG. 1 is a view schematically illustrating a canister for a vehicle in the related art.
Figure 2:
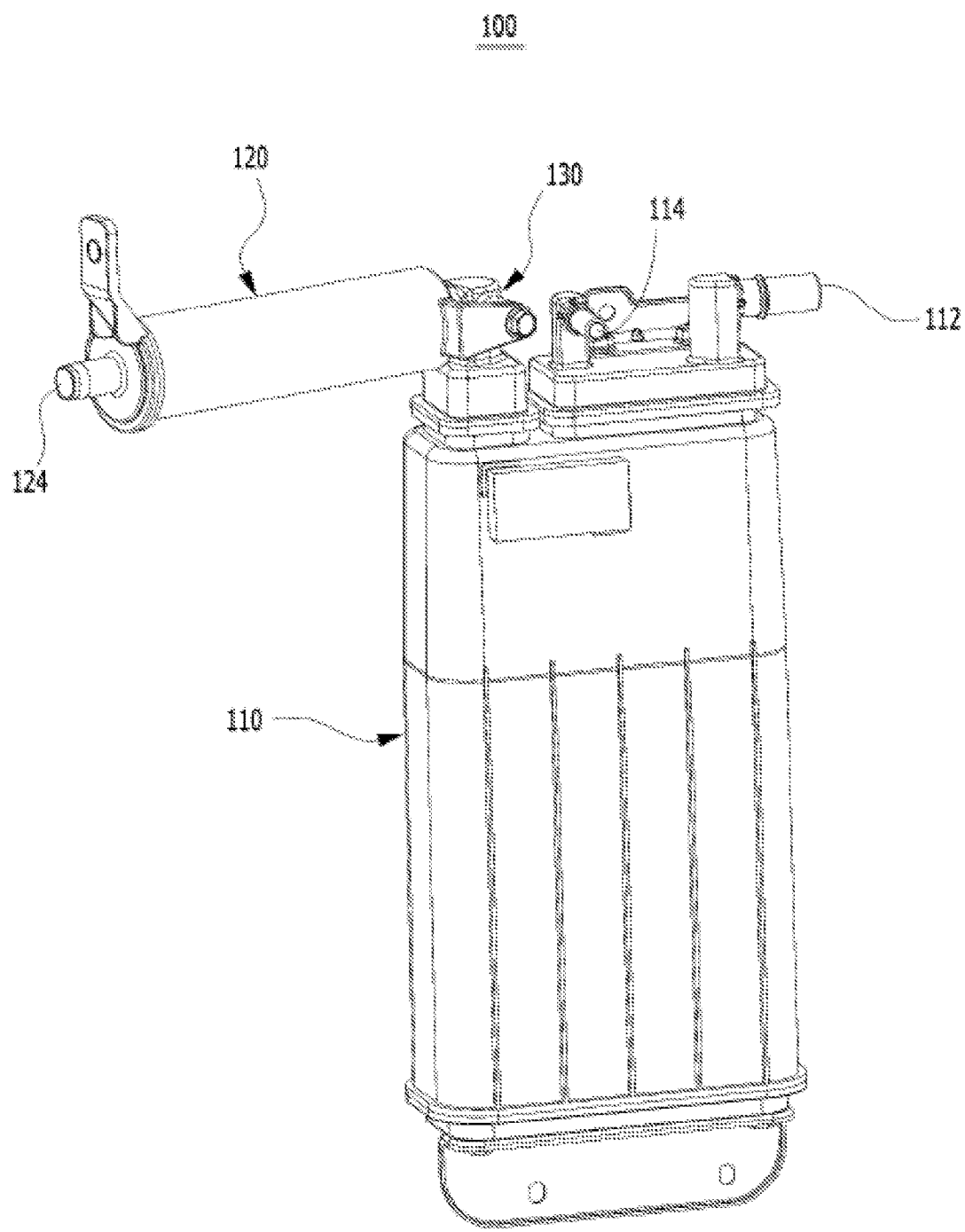
FIG. 2 is a view schematically illustrating a canister for a vehicle having an auxiliary canister, according to an embodiment of the present invention.
Figure 3:
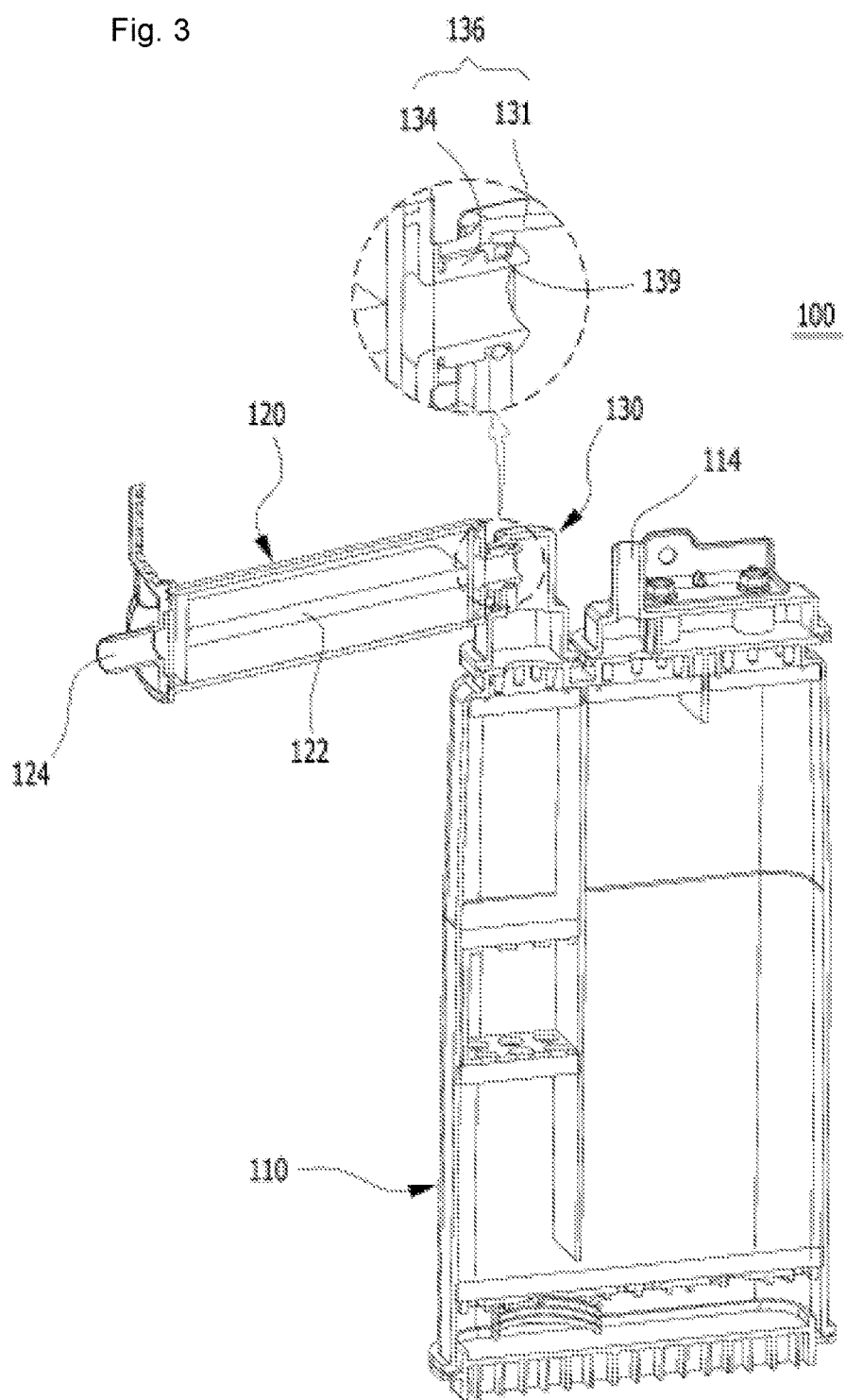
FIG. 3 is a sectional view of the canister for a vehicle, which has the auxiliary canister, according to the embodiment of the present invention.

Referring to FIGS. 2 and 3, the canister 100 for a vehicle, which has the auxiliary canister, according to the embodiment of the present invention, may include: the main canister 110 having an inlet 112 and an outlet 114 formed therein, wherein an evaporation gas (HC) may be introduced into the canister through the inlet 112 from a fuel tank and the evaporation gas introduced through the inlet 112 may be discharged through the outlet 114 to the intake side of an engine when the engine is driven; and the auxiliary canister 120 installed to communicate with the main canister 110 in order to allow external air to be introduced into the main canister 110 or to allow the evaporation gas (HC) to flow when the engine is turned off, and may further include the second trapping member 122 provided inside the auxiliary canister 120, which is formed of a plastic material and has a plurality of pores in the form of a honeycomb.

The main canister 110 has a trapping member (not illustrated) therein for trapping the evaporation gas that is introduced from the fuel tank (not illustrated), and the inlet 112 through which the evaporation gas generated by the fuel tank may be introduced and the outlet 114 through which the introduced evaporation gas may be supplied to the engine are formed on a side of the upper portion thereof.

The trapping member may temporarily adsorb and store the evaporation gas that is introduced from the fuel tank and may supply the adsorbed evaporation gas to the intake side of the engine when the engine of the vehicle is driven in order to minimize the leakage of the evaporation gas to the outside, thereby preventing fuel loss.

In this case, any material capable of temporarily trapping the evaporation gas, such as activated carbon, may be employed for the trapping member without any limitation.

Further, the auxiliary canister 120 is installed on a side of the main canister 110 so as to communicate with the main canister 110.

The auxiliary canister 120 serves to allow air required for driving the engine to be introduced from the outside and to trap the evaporation gas that is not trapped by the main canister 110, and has an air inlet 124 formed therein for allowing external air to be introduced.

In this case, the second trapping member 122 capable of trapping the evaporation gas is provided within the auxiliary canister 120.

Figure 4:
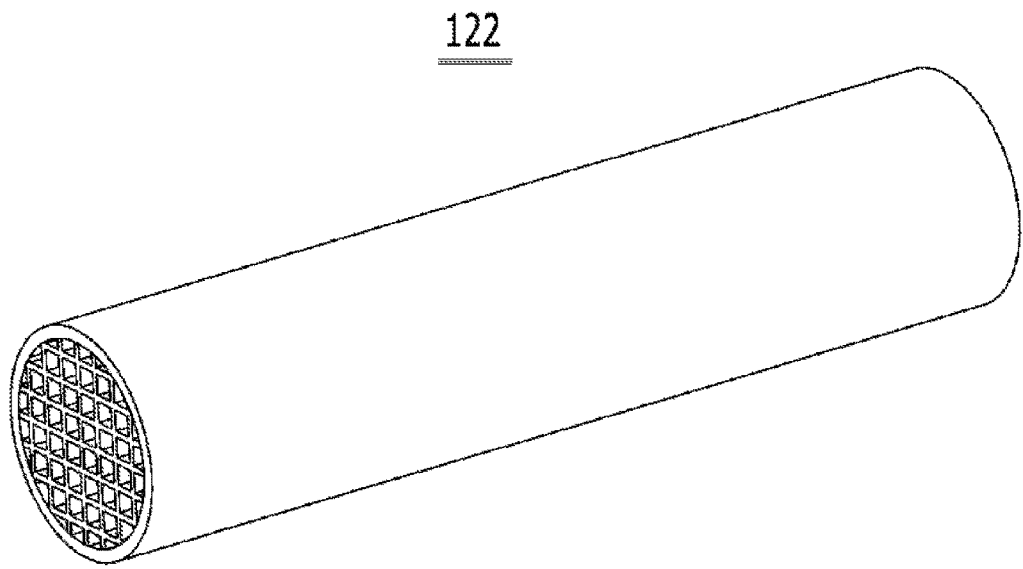
FIG. 4 is a view schematically illustrating the shape of the second trapping member that is used in the embodiment of the present invention.

The second trapping member 122 may be formed of various types of plastic materials. In the embodiment of the present invention, as illustrated in FIG. 4, the second trapping member 122 may have a cylindrical shape and may be formed in a honeycomb shape that has a plurality of pores therein, and activated carbon may be applied to the surface of the second trapping member 122 by a spray method or by an impregnation (dipping) method.

Here, in a case where the second trapping member 122 has a structure formed of a plastic material, to which the activated carbon is applied, in the embodiment of the present invention, mesopores having a length of 20 Å to 5000 Å may be formed in the surface of the second trapping member 122 so that the trapping member may adsorb various types of foreign substances including the evaporation gas.

Figure 6:
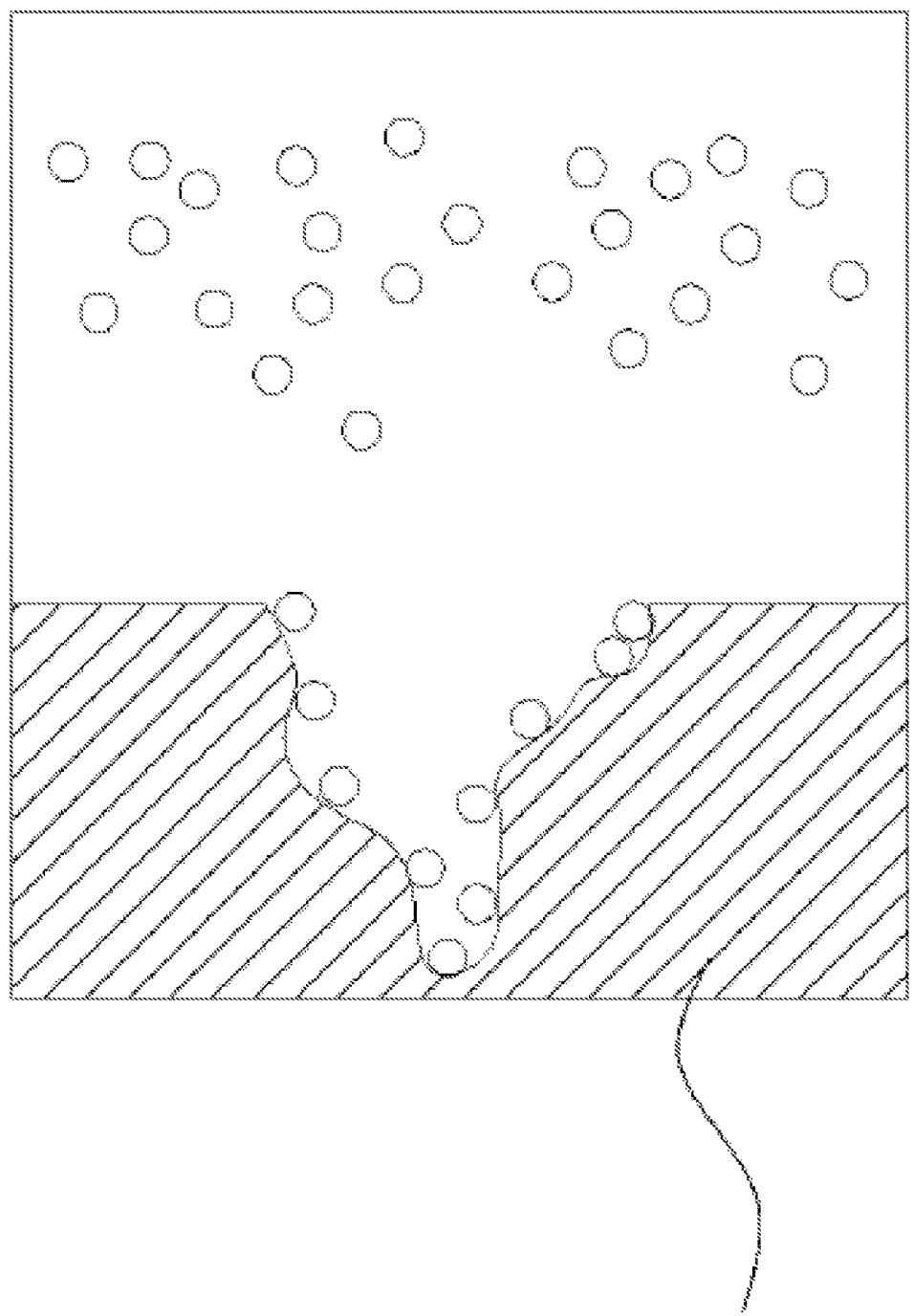
FIG. 6 is a view schematically illustrating other embodiments of the second trapping member according to the embodiment of the present invention.

Namely, as illustrated in FIG. 6, a plurality of pores having an inverted triangular shape may be formed in the surface of the second trapping member, to which the activated carbon is applied, so that the evaporation gas (HC) may be adsorbed by the pores.

Accordingly, the activated carbon is applied to the surface of the partition walls of the pores, which are formed in a honeycomb shape within the second trapping member 122, and a large number of pores are formed as a result, which makes it possible to effectively trap the evaporation gas and foreign substances.

Figure 5A:
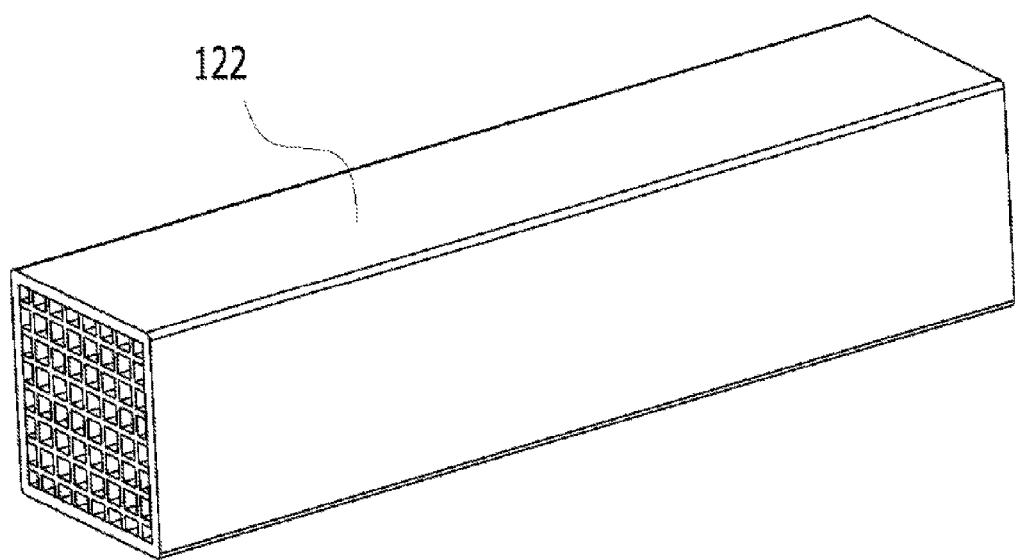
FIG. 5A is a view schematically illustrating an example of the absorbent material applied to the second trapping member, according to the embodiment of the present invention, and the evaporation gas adsorbed onto the absorbent material.
Figure 5B:
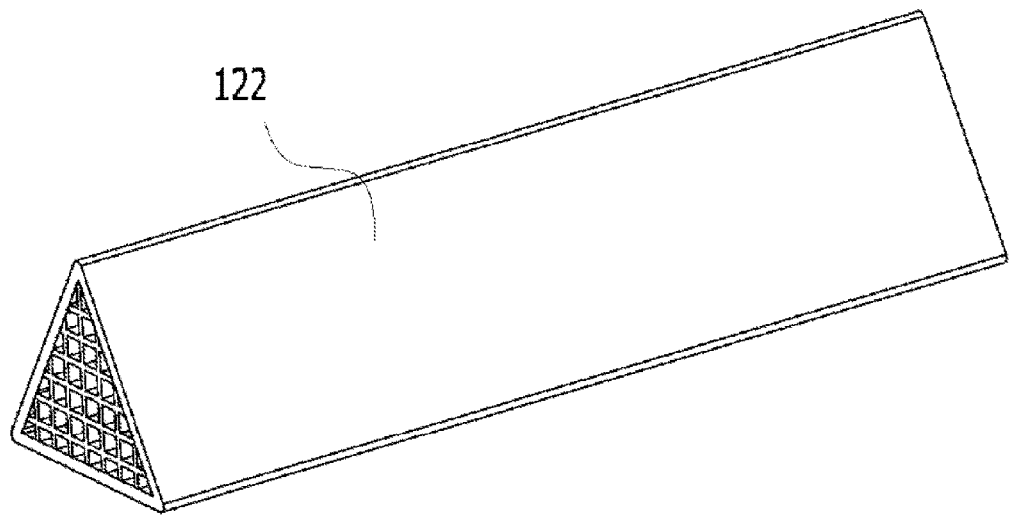
FIG. 5B is a view schematically illustrating a further example of the absorbent material applied to the second trapping member, according to the embodiment of the present invention, and the evaporation gas adsorbed onto the absorbent material.
Figure 5C:
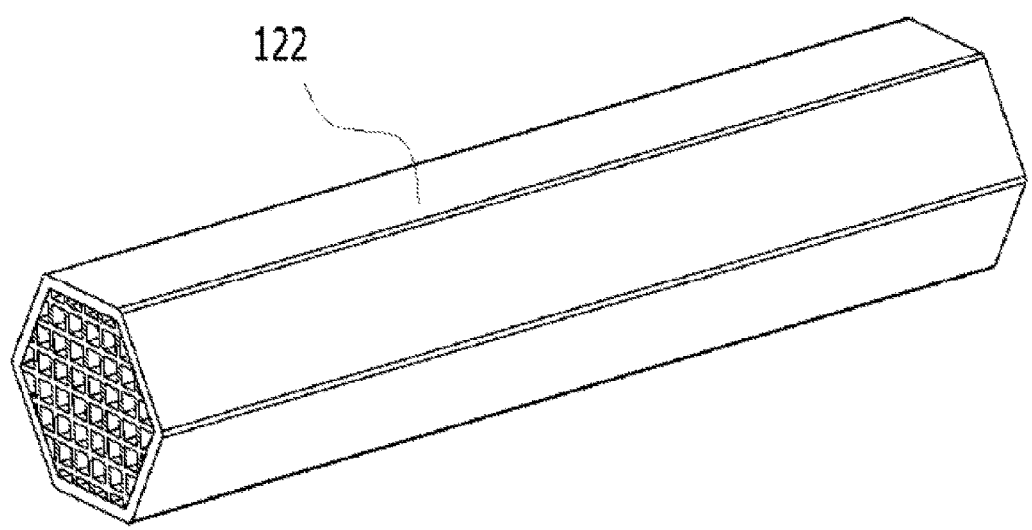
FIG. 5C is a view schematically illustrating a still further example of the absorbent material applied to the second trapping member, according to the embodiment of the present invention, and the evaporation gas adsorbed onto the absorbent material.

Further, although the second trapping member 122 is illustrated in a cylindrical shape in the embodiment of the present invention, the second trapping member 122 may be formed in various shapes, such as a rectangular shape, a triangular shape, a hexagonal shape, etc., as illustrated in FIGS. 5a-5c in some cases.

Namely, any shape capable of enhancing trapping efficiency by increasing a contact area with the evaporation gas introduced into the auxiliary canister 120 may be used without any limitation.

In addition, in the embodiment of the present invention, the second trapping member 122 formed in a honeycomb shape may be configured to have 16 holes, 44 holes, 120 holes, or 180 holes in some cases.

Namely, it is possible to adjust the ventilation resistance within the auxiliary canister 120 with different hole intervals of 9 mm, 5.5 mm, 3 mm, 2.4 mm, etc.

Here, the table below shows data obtained by measuring the evaporation gas discharged to the outside of the canister with the second trapping members 122 having different diameters and lengths installed within the auxiliary canister 120.

Here, although the second trapping member 122 is illustrated as a circular member having a diameter of 30 mm or 40 mm in the embodiment of the present invention, the maximum width may be 30 mm or 40 mm when the second trapping member 122 is formed in a polygonal shape in some cases.

Namely, in a case where the second trapping member 122 is formed in a circular shape, the diameter thereof may be 30 mm or 40 mm, and in a case where the second trapping member 122 is formed in a polygonal shape, the width thereof may be 30 mm or 40 mm.

Meanwhile, the auxiliary canister 120 may be removably installed in the canister 100 for a vehicle, which has the auxiliary canister, according to the embodiment of the present invention.

To this end, the canister 100, according to the embodiment of the present invention, may further include a connecting part 130.

Figure 7:
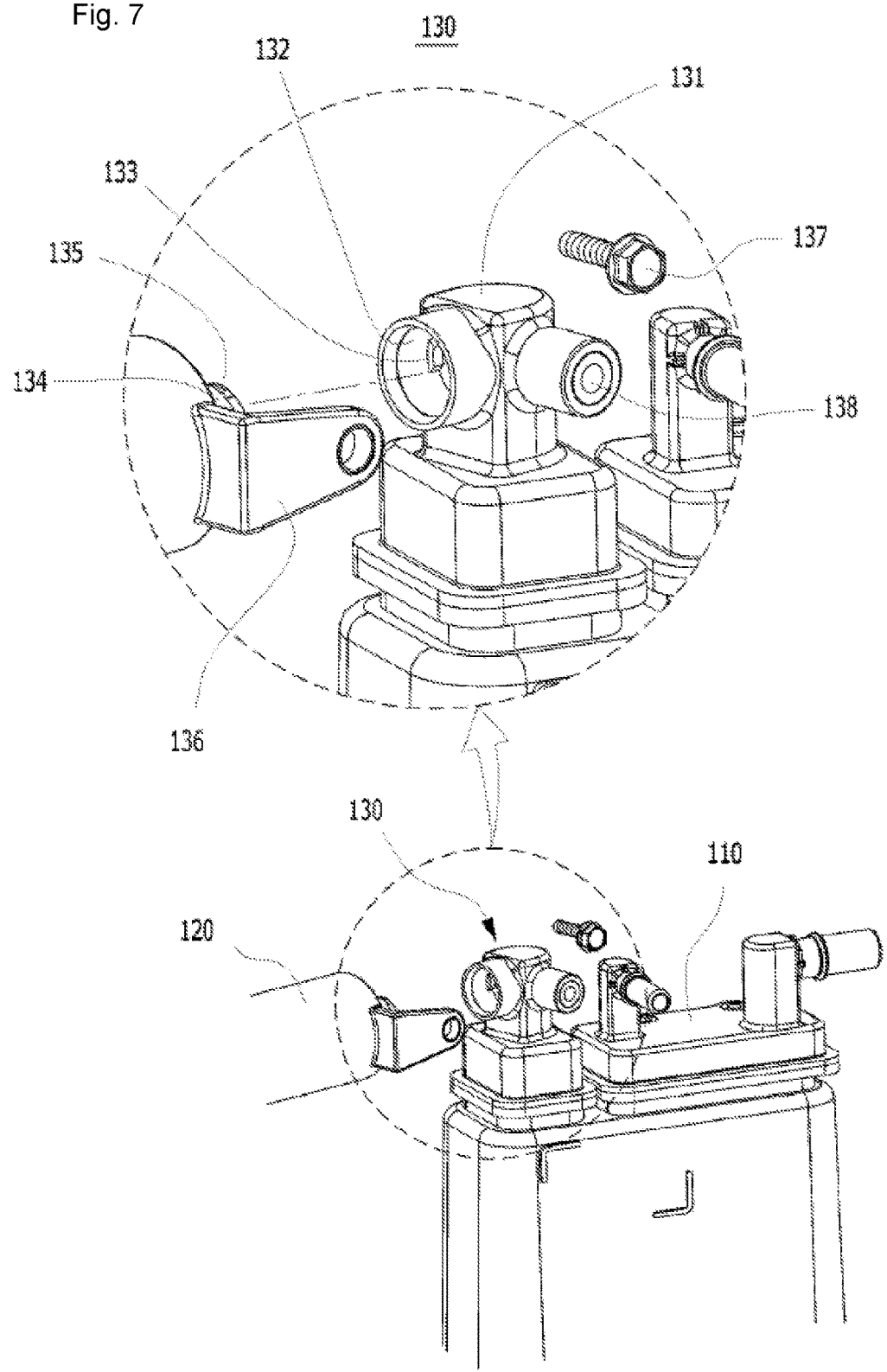
FIG. 7 is a view schematically illustrating a connecting part of the canister for a vehicle, which has the auxiliary canister, according to the embodiment of the present invention.

Referring to FIG. 7, the connecting part 130 is formed on a side of the main canister 110 to protrude from the main canister 110, and may include: a main connection part 131 that is formed to communicate with the interior of the main canister 110 and has a coupling hole 132 formed therein into which a part of the auxiliary canister 120 may be inserted; an auxiliary insertion part 134 inserted into the coupling hole 132 of the main connection part 131, wherein the auxiliary insertion part 134 is formed on a side of the auxiliary canister 120 to protrude from the auxiliary canister 120 and communicates with the interior of the auxiliary canister 120; and a coupling maintaining member 136 that

| Canister Type | 1 | 2 | 3 | 4 | 5 | 6 | 7 |
| --- | --- | --- | --- | --- | --- | --- | --- |
| Diameter * Length | — | 30 * 50 | 30 * 100 | 30 * 150 | 40 * 50 | 40 * 100 | 40 * 150 |
| Amount of applied absorbent material (g/l) | — | 4 | 7 | 9 | 7 | 12 | 19 |
| Amount of adsorbed evaporation gas (g/l) | — | 1.3 | 2.4 | 3.5 | 2.1 | 3.8 | 4.5 |
| Amount of discharged evaporation gas (mmg) | 100 | 41 | 23 | 16 | 28 | 19 | 12 |

The table shows that the evaporation gas discharged from the fuel tank was all discharged to the outside in the case where the second trapping member 122 was not inserted into the canister; the evaporation gas of 3.5 g/l was suctioned and the evaporation gas of 16 mmg was discharged to the outside of the canister in the case where the second trapping member 122 having a diameter of 30 mm and a length of 150 mm was used; and the evaporation gas of 4.5 g/l was suctioned and the evaporation gas of 12 mmg was discharged to the outside of the canister in the case where the second trapping member 122 having a diameter of 40 mm and a length of 150 mm was used.

Accordingly, in the embodiment of the present invention, in a case where the amount of discharged evaporation gas is less than 20 mmg, which is the international standard of permission, the second trapping member 122 having a diameter of 30 mm and a length of 150 mm, or the second trapping member 122 having a diameter of 40 mm and a length of 150 mm, may be used such that the amount of discharged evaporation gas may reach 16 mmg or 12 mmg.

may prevent the auxiliary insertion part 134 from being separated from the main connection part 131 when the main connection part 131 and the auxiliary insertion part 134 are coupled to each other.

Specifically, the main connection part 131 is formed to protrude from the upper portion of the main canister 110. In this case, the main connection part 131 may be formed to communicate with the interior of the main canister 110 in order to allow air to flow.

Further, the auxiliary insertion part 134 may be formed on a side of the auxiliary canister 120 to protrude in the longitudinal direction of the auxiliary canister 120. The auxiliary insertion part 134 may also be formed to communicate with the interior of the auxiliary canister 120 and may be coupled with the main connection part 131.

Here, a plurality of fixing protrusions 133 are formed to radially protrude from the coupling hole 132 of the main connection part 131, and a plurality of stopping protrusions 135 are formed to protrude from the outer circumferential surface of the auxiliary insertion part 134, which is coupled with the main connection part 131, and prevent the auxiliary insertion part 134 from being separated from the main connection part 131 when being coupled to the main connection part 131.

Figure 8A:
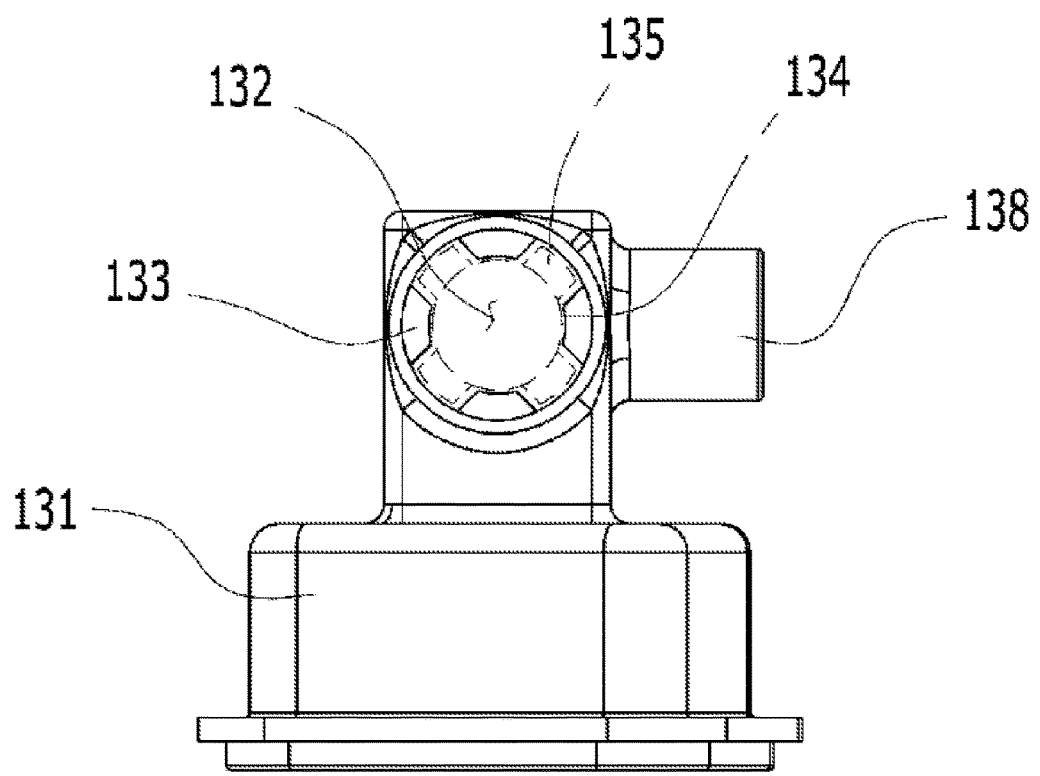
FIGS. 8A and 8B are views schematically illustrating a state in which the connecting part of the canister for a vehicle, which has the auxiliary canister, according to the embodiment of the present invention, is coupled.
Figure 8B:
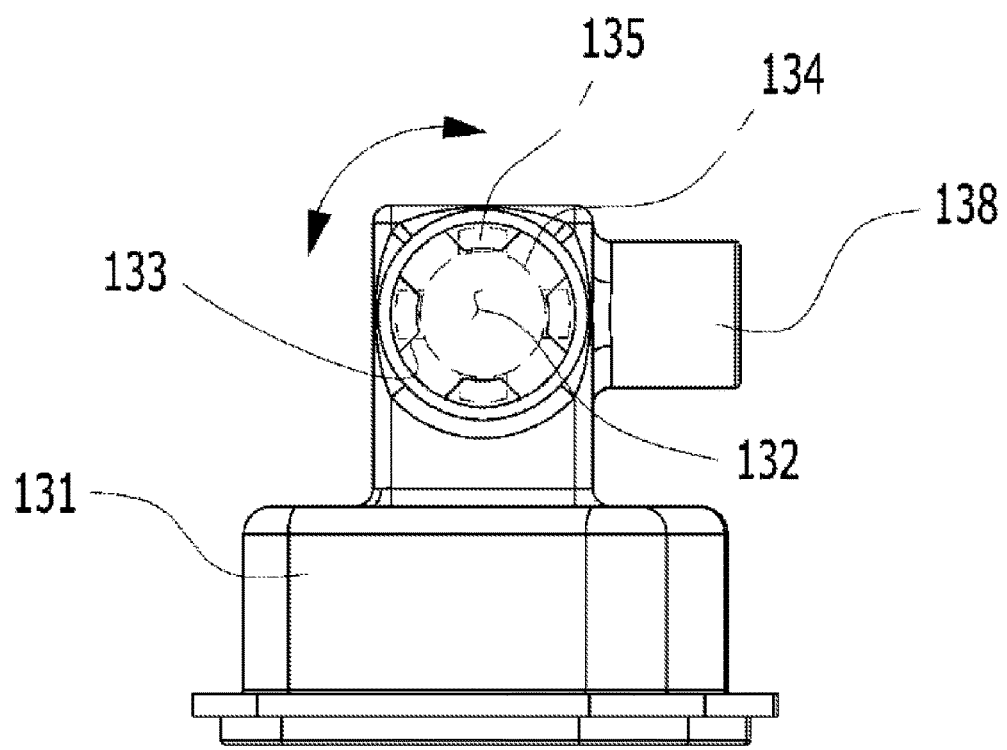

Namely, as illustrated in FIG. 8A, the auxiliary insertion part 134 of the auxiliary canister 120 is inserted into the coupling hole 132 formed in the main connection part 131 of the main canister 110. In this case, the stopping protrusions 135 of the auxiliary insertion part 134 are inserted between the fixing protrusions 133 formed in the coupling hole 132. Then, as illustrated in FIG. 8B, the auxiliary canister 120 is rotated such that the fixing protrusions 133 and the stopping protrusions 135 make surface-to-surface contact with each other and are not separated from each other.

Meanwhile, the coupling maintaining member 136 serves to reinforce the coupling force between the main canister 110 and the auxiliary canister 120 while maintaining the fixing protrusions 133 and the stopping protrusions 135 in the surface-to-surface contact state, and may be formed on a side of the side surface of the auxiliary canister 120 so as to be bent in the shape of "┐" and may be coupled with the main connection part 131 by a bolt 137.

Namely, the coupling maintaining member 136 may be formed such that one end thereof is fixedly coupled to one end of the auxiliary canister 120 in which the auxiliary insertion part 134 is formed and the other end thereof is directed toward the main connection part 131, and may be removably coupled to a screw hole 138, which is formed on a side of the side surface of the main connection part 131, by the bolt 137.

In this case, in the embodiment of the present invention, an o-ring 139 may be installed on the outer circumferential surface of the auxiliary insertion part 134, which is inserted into the main connection part 131, to maintain air tightness.

Accordingly, the canister 100 for a vehicle, which has the auxiliary canister, according to the embodiment of the present invention, includes the second trapping member 122 therein, which has a rectangular plate that is formed of a plastic material and to which an absorbent material is applied, to prevent a ventilation resistance increase even though foreign substances are excessively trapped and to minimize bleed emission that may be generated by the ventilation resistance increase.

Further, the canister for a vehicle, which has the auxiliary canister, according to the embodiment of the present invention, may ensure the life time and enhance the trapping efficiency of the evaporation gas by separating the auxiliary canister 120, which has been used for a long period of time, from the main canister 110 through the connecting part 130 and then replacing only the auxiliary canister 120.

While the embodiments of the present invention has been described above, those skilled in the art can diversely modify and change the present invention through the addition, modification, or deletion of elements, without departing from the spirit and scope of the present invention disclosed in the claims, and such modifications and changes may fall within the scope of the present invention.

DESCRIPTION OF REFERENCE NUMERALS

100: Canister
110: Main canister
112: Inlet
114: Outlet
120: Auxiliary canister
122: Second trapping member
130: Connecting part
131: Main connection part
132: Coupling hole
133: Fixing protrusion
134: Auxiliary insertion part
135: Stopping protrusion
136: Coupling maintaining member
137: Bolt
138: Screw hole
130: O-ring

What is claimed is:

1. A canister for a vehicle having an auxiliary canister, the canister comprising:
   a main canister that has an inlet and an outlet formed therein, an evaporation gas being introduced into the main canister through the inlet from a fuel tank and the evaporation gas introduced through the inlet being discharged through the outlet to an intake side of an engine when the engine is driven, and has a first trapping member therein; and
   an auxiliary canister that is installed to communicate with the main canister to allow external air to be introduced into the main canister or to allow the evaporation gas to flow when the engine is turned off, and has a second trapping member therein,
   wherein the auxiliary canister comprises the second trapping member therein, which has a plurality of pores in the form of a honeycomb and to which an absorbent material is applied in a spray method or in an impregnation method, and the second trapping member has a width of 30 mm to 40 mm and a length of 150 mm, and
   wherein the second trapping member has activated carbon applied to a surface of partition walls that form the pores, and a plurality of pores having an inverted triangular shape are formed in the surface of the second trapping member to which the activated carbon is applied.

2. The canister of claim 1, further comprising a connecting part by which the auxiliary canister is removably coupled to the main canister.

3. The canister of claim 2, wherein the connecting part is formed on a side of the main canister to protrude from the main canister, and comprises:
   a main connection part formed to communicate with an interior of the main canister, wherein the main connection part has a coupling hole formed therein into which a part of the auxiliary canister is to be inserted;
   an auxiliary insertion part inserted into the coupling hole of the main connection part, wherein the auxiliary insertion part is formed on a side of the auxiliary canister to protrude from the auxiliary canister and communicates with an interior of the auxiliary canister; and
   a coupling maintaining member that prevents the auxiliary insertion part from being separated from the main connection part when the main connection part and the auxiliary insertion part are coupled to each other.

4. The canister of claim 3, wherein a plurality of fixing protrusions are formed to radially protrude from the coupling hole of the main connection part, and a plurality of stopping protrusions are formed to protrude from an outer circumferential surface of the auxiliary insertion part that is coupled with the main connection part, wherein the fixing protrusions and the stopping protrusions make contact with each other to prevent the auxiliary insertion part from being separated from the main connection part when being coupled with the main connection part.

5. The canister of claim 3, wherein the coupling maintaining member is formed such that one end thereof is fixedly coupled to one end of the auxiliary canister in which the auxiliary insertion part is formed and the other end thereof is directed toward the main connection part, and is removably coupled to a screw hole, which is formed on a side of a side surface of the main connection part, by a bolt.

* * * * *